United States Patent
Hon et al.

(10) Patent No.: US 6,782,362 B1
(45) Date of Patent: Aug. 24, 2004

(54) SPEECH RECOGNITION METHOD AND APPARATUS UTILIZING SEGMENT MODELS

(75) Inventors: Hsiao-Wuen Hon, Woodinville, WA (US); Kuansan Wang, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/559,509

(22) Filed: Apr. 27, 2000

(51) Int. Cl.[7] .............................................. G10L 15/00
(52) U.S. Cl. ...................................... 704/240; 704/255
(58) Field of Search ................................ 704/231, 240, 704/243, 246, 247, 255, 256

(56) References Cited

U.S. PATENT DOCUMENTS

| | | | |
|---|---|---|---|
| 6,009,392 A | * 12/1999 | Kanevsky et al. | 704/245 |
| 6,301,561 B1 | * 10/2001 | Saul | 704/256 |
| 6,401,064 B1 | * 6/2002 | Saul | 704/240 |
| 6,542,866 B1 | * 4/2003 | Jiang et al. | 704/255 |

OTHER PUBLICATIONS

"Probabilistic–trajectory segmental HMMs", *Computer Speech and Language*, by Wendy J. Holmes et al., Article No. csla. 1998.0048, pp. 3–37 (1999).

"Parametric Trajectory Mixtures for LVCSR", by Manhung Siu et al., ICSLP–1998, 4 pages.

"Speech Recognition Using Hidden Markov Models with Polynomial Regression Functions as Nonstationary States", by Li Deng et al., IEEE Transactions on Speech on Audio Processing, vol. 2, No. 4, pp. 507–520 (Oct. 1994).

"From HMM's to Segment Models: A Unified View of Stochastic Modeling for Speech Recognition", by Mari Ostendorf et al., IEEE Transactions on Speech and Audio Processing, vol. 4, No. 5, pp. 360–379 (Sep. 1996).

* cited by examiner

*Primary Examiner*—Daniel Abebe
(74) *Attorney, Agent, or Firm*—Theodore M. Magee; Westman, Champlin & Kelly, P.A.

(57) ABSTRACT

A method and apparatus determine the likelihood of a sequence of words based in part on a segment model. The segment model includes trajectory expressions formed as the product of a polynomial matrix and a generation matrix. The likelihood of the sequence of words is based in part on a segment probability derived by subtracting the trajectory expressions from a feature vector matrix that contains a sequence of feature vectors for a segment of speech. Aspects of the method and apparatus also include training the segment model using such a segment probability.

21 Claims, 3 Drawing Sheets

SPEECH RECOGNITION METHOD AND APPARATUS UTILIZING SEGMENT MODELS

BACKGROUND OF THE INVENTION

The present invention relates to speech recognition. In particular, the present invention relates to the use of segment models to perform speech recognition.

In speech recognition systems, an input speech signal is converted into words that represent the verbal content of the speech signal. This conversion begins by converting the analog speech signal into a series of digital values. The digital values are then passed through a feature extraction unit, which computes a sequence of feature vectors based on the digital values. Each feature vector is typically multi-dimensional and represents a single frame of the speech signal.

To identify a most likely sequence of words, the feature vectors are applied to one or more models that have been trained using a training text. Typically, this involves applying the feature vectors to a frame-based acoustic model in which a single frame state is associated with a single feature vector.

Recently, however, segment models have been introduced that associate multiple feature vectors with a single segment state. The segment models are thought to provide a more accurate model of large-scale transitions in human speech.

Although current segment models provide improved modeling of large-scale transitions, their training time and recognition time are less than optimum. As such, more efficient segment models are needed.

SUMMARY OF THE INVENTION

A method and apparatus determine the likelihood of a sequence of words based in part on a segment model. The segment model includes trajectory expressions formed as the product of a generation matrix and a parameter matrix. The likelihood of the sequence of words is based in part on a segment probability. The segment probability is derived in part by matching the trajectory expressions to a feature vector matrix that contains a sequence of feature vectors for a segment of speech.

Aspects of the method and apparatus also include training the segment model using such a segment probability.

DETAILED DESCRIPTION OF ILLUSTRATIVE EMBODIMENTS

Figure 1:
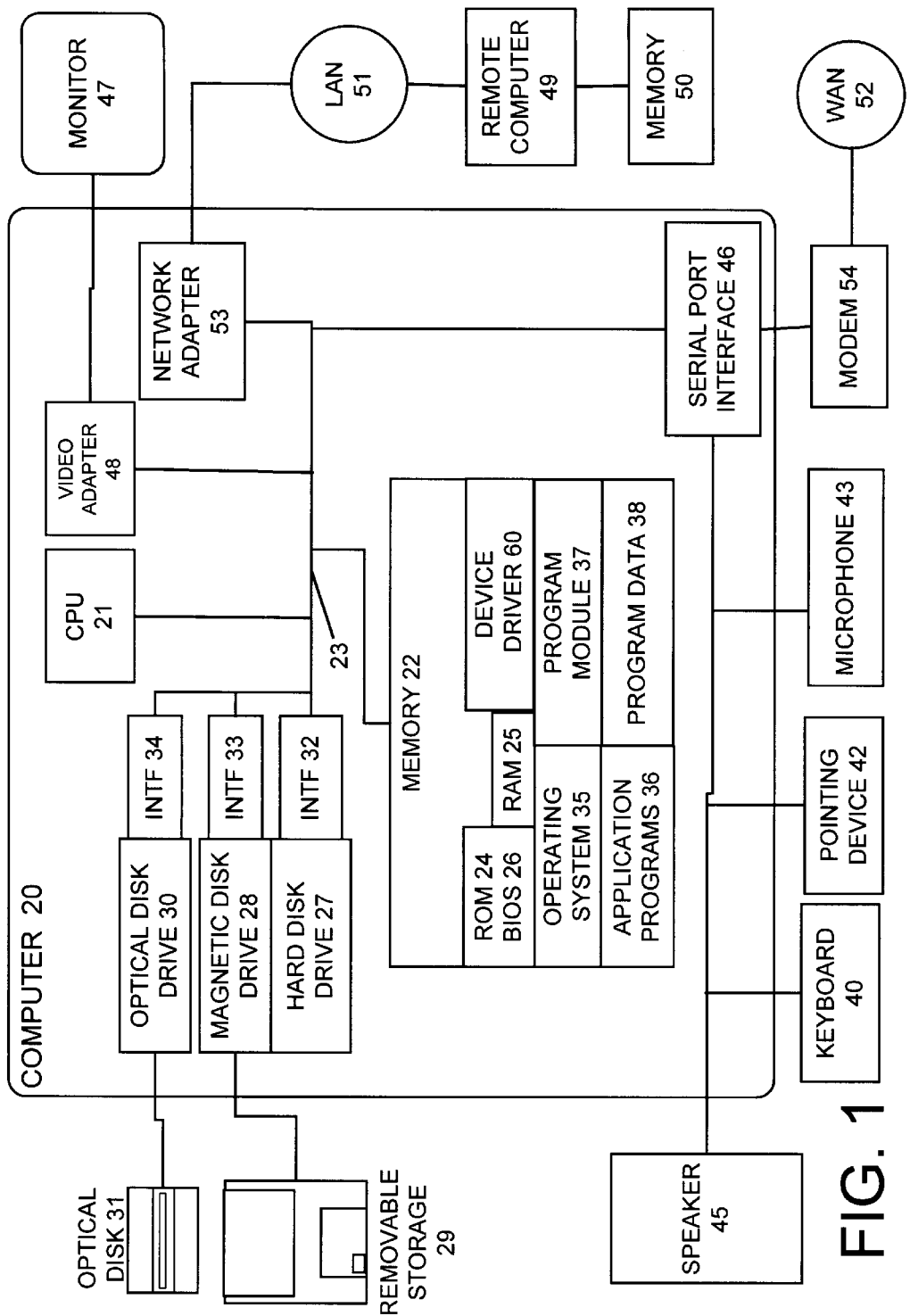
FIG. 1 is a plan view of a general computing environment in which one embodiment of the present invention is used.

FIG. 1 and the related discussion are intended to provide a brief, general description of a suitable computing environment in which the invention may be implemented. Although not required, the invention will be described, at least in part, in the general context of computer-executable instructions, such as program modules, being executed by a personal computer. Generally, program modules include routine programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit (CPU) 21, a system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory 22 includes read only memory (ROM) 24 and random access memory (RAM) 25. A basic input/output (BIOS) 26, containing the basic routine that helps to transfer information between elements within the personal computer 20, such as during start-up, is stored in ROM 24. The personal computer 20 further includes a hard disk drive 27 for reading from and writing to a hard disk (not shown), a magnetic disk drive 28 for reading from or writing to removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, magnetic disk drive interface 33, and an optical drive interface 34, respectively. The drives and the associated computer-readable media provide nonvolatile storage of computer readable instructions, data structures, program modules and other data for the personal computer 20.

Although the exemplary environment described herein employs the hard disk, the removable magnetic disk 29 and the removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memory (ROM), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the personal computer 20 through local input devices such as a keyboard 40, pointing device 42 and a microphone 43. Other input devices (not shown) may include a joystick, game pad, satellite dish, scanner, or the like. These and other input devices are often connected to the processing unit 21 through a serial port interface 46 that is coupled to the system bus 23, but may be connected by other interfaces, such as a sound card, a parallel port, a game port or a universal serial bus (USB). A monitor 47 or other type of display device is also connected to the system bus 23 via an interface, such as a video adapter 48. In addition to the monitor 47, personal computers may typically include other peripheral output devices, such as a speaker 45 and printers (not shown).

The personal computer 20 may operate in a networked environment using logic connections to one or more remote computers, such as a remote computer 49. The remote computer 49 may be another personal computer, a hand-held device, a server, a router, a network PC, a peer device or other network node, and typically includes many or all of the elements described above relative to the personal computer 20, although only a memory storage device 50 has been illustrated in FIG. 1. The logic connections depicted in FIG. 1 include a local area network (LAN) 51 and a wide area network (WAN) 52. Such networking environments are commonplace in offices, enterprise-wide computer network Intranets, and the Internet.

When used in a LAN networking environment, the personal computer 20 is connected to the local area network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a network environment, program modules depicted relative to the personal computer 20, or portions thereof, may be stored in the remote memory storage devices. It will be appreciated that the network connections shown are exemplary and other means of establishing a communications link between the computers may be used. For example, a wireless communication link may be established between one or more portions of the network.

Although FIG. 1 shows an exemplary environment, the present invention is not limited to a digital-computing environment. In particular, the present invention can be operated on analog devices or mixed signal (analog and digital) devices. Furthermore, the present invention can be implemented on a single integrated circuit, for example, in small vocabulary implementations.

Figure 2:
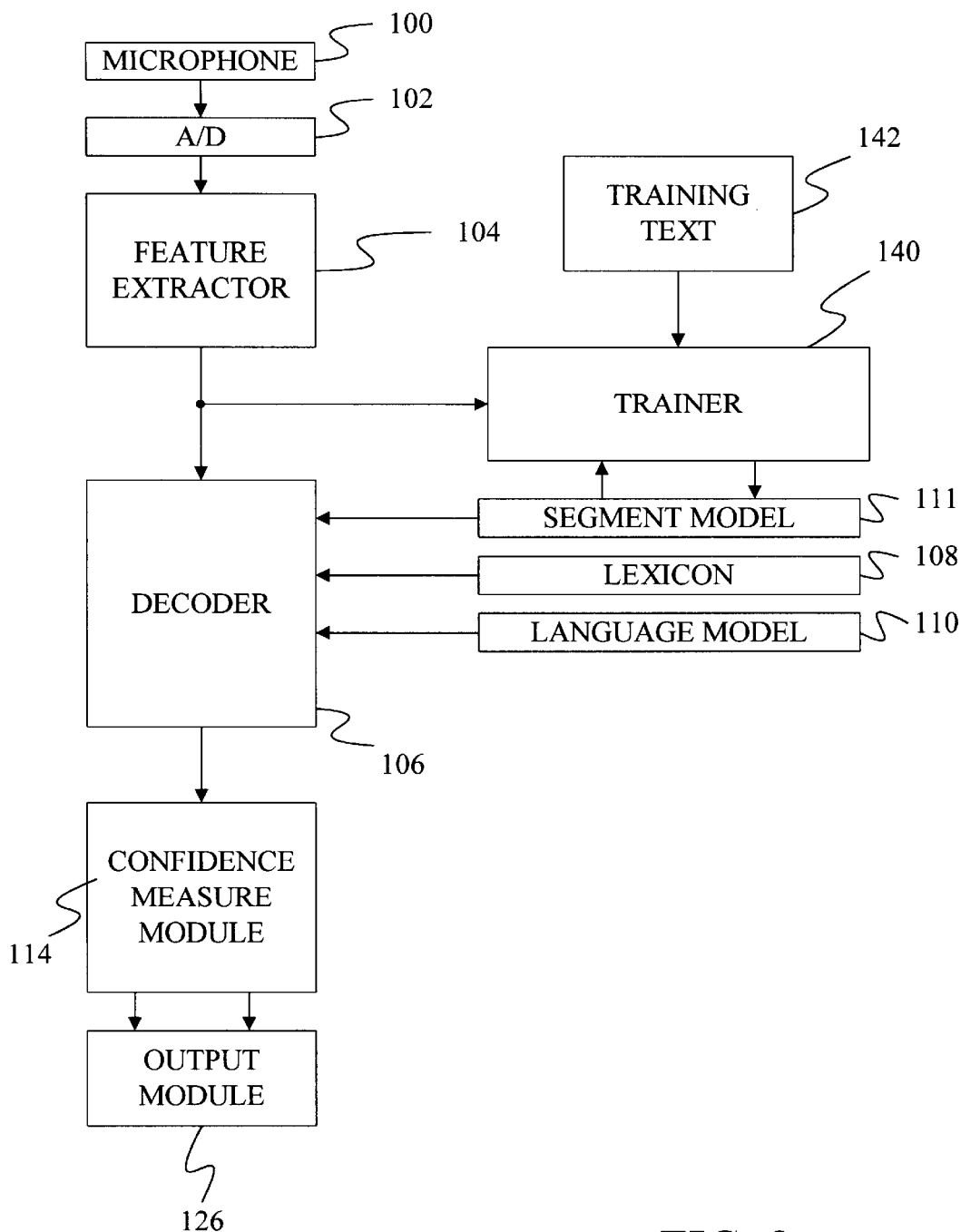
FIG. 2 is a block diagram of a speech recognition system of an embodiment of the present invention.

FIG. 2 provides a more detailed block diagram of modules of the general environment of FIG. 1 that are particularly relevant to the present invention. In FIG. 2, an input speech signal is converted into an electrical signal by a microphone 100, which is connected to an analog-to-digital (A-to-D) converter 102. A-to-D converter 102 converts the analog signal into a series of digital values. In several embodiments, A-to-D converter 102 samples the analog signal at 16 kHz thereby creating 16 kilobytes of speech data per second.

The digital data created by A-to-D converter 102 is provided to a feature extractor 104 that extracts a feature from the digital speech signal. Examples of feature extraction modules include modules for performing Linear Predictive Coding (LPC), LPC derived cepstrum, Perceptive Linear Prediction (PLP), Auditory model feature extraction, and Mel-Frequency Cepstrum Coefficients (MFCC) feature extraction. Note that the invention is not limited to these feature extraction modules and that other modules may be used within the context of the present invention.

The feature extraction module receives the stream of digital values from A-to-D converter 102, and produces a stream of feature vectors that are each associated with a frame of the speech signal. In many embodiments, the centers of the frames are separated by 10 milliseconds.

The stream of feature vectors produced by the extraction module is provided to a decoder 106, which identifies a most likely sequence of words based on the stream of feature vectors, a segment model 111, a language model 110, and a lexicon 112.

Segment model 111 indicates how likely it is that a sequence of feature vectors would be produced by a segment of a particular duration. The segment model uses multiple feature vectors at the same time to make a determination about the likelihood of a particular segment. Because of this, it provides a good model of large-scale transitions in the speech signal. In addition, the segment model looks at multiple durations for each segment and determines a separate probability for each duration. As such, it provides a more accurate model for segments that have longer durations.

Language model 110 provides a set of likelihoods that a particular sequence of words will appear in the language of interest. In many embodiments, the language model is based on a text database such as the North American Business News (NAB), which is described in greater detail in a publication entitled CSR-III Text Language Model, University of Penn., 1994. The language model may be a context-free grammar or a statistical N-gram model such as a trigram. In one embodiment, the language model is a compact trigram model that determines the probability of a sequence of words based on the combined probabilities of three-word segments of the sequence.

Based on the segment model, the language model, and the lexicon, decoder 106 identifies a most likely sequence of words from all possible word sequences. The particular method used to select the most probable sequence of words is discussed further below.

The most probable sequence of hypothesis words is provided to confidence measure module 114. Confidence measure module 114 identifies which words are most likely to have been improperly identified by the speech recognizer, based in part on a frame-based acoustic model. Confidence measure module 114 then provides the sequence of hypothesis words to an output module 126 along with identifiers indicating which words may have been improperly identified. Those skilled in the art will recognize that confidence measure module 114 is not necessary for the practice of the present invention.

Before segment model 111 may be used to decode a sequence of input feature vectors, it must be trained. In FIG. 2, such training is performed by trainer 140 based on training text 142, past model parameters from segment model 111 and training feature vectors from feature extractor 104. The method of training under the present invention is discussed further below. Those skilled in the art will recognize that a speech recognition system does not need trainer 140 if its models have been previously trained.

In most embodiments of the present invention, the segment model described above is a parametric trajectory segment model. In one embodiment, the parameters for a trajectory assume the form of polynomials. However, those skilled in the art will appreciate that trajectory expressions can be made using basis functions other than polynomials such as wavelets and sinusoidal functions. Although the description in the following uses polynomials as an example, the present invention may be applied to other trajectory modeling techniques as well.

In a polynomial trajectory model, each component or dimension of the observed feature vector is modeled by a family of n-order polynomial functions. Thus, if there are twenty components (or dimensions) in a feature vector, there will be a family of twenty n-order polynomial functions. The polynomial function for any one dimension of the feature vectors describes a smooth curve that extends through the frames associated with the feature vectors.

Figure 3:
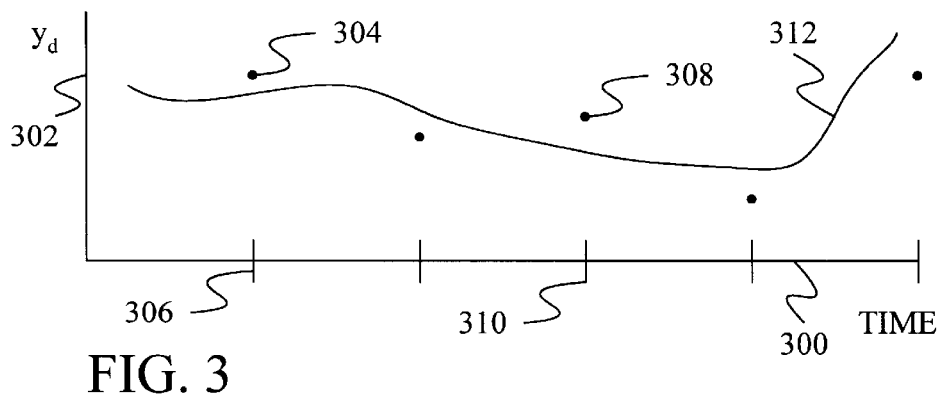
FIG. 3 is a graph showing a segment model curve and a sequence of feature values.

FIG. 3 provides a graph showing a curve described by a polynomial function for a single dimension of the feature vectors. In FIG. 3, time is shown along horizontal axis 300 and the value of the dth dimension of the feature vector is shown on vertical axis 302.

In FIG. 3, actual values for the dth component at selected frames are shown as dots. For example, dot 304 shows the actual value of the dth dimension for frame 306. Similarly, dot 308 represents the value of the dth dimension for the feature vector at frame 310. Curve 312 of FIG. 3 represents the segment model curve generated by the polynomial function for a particular segment. Note that FIG. 3 only shows one dimension of the feature vectors and that separate curves are provided for each dimension within the segment model.

The segment model curve of FIG. 3 can be described mathematically in relation to an observation vector $y_t$ from a series of observation vectors $Y=(Y_0, Y_1 \ldots Y_{T-1})$ as:

$$y_t = CF_t + e_t(\Sigma) \quad \text{EQ. 1}$$

Where $y_t$ is a D-dimensional feature vector, C is a trajectory parameter matrix, $F_t$ is a trajectory generation matrix containing a family of polynomial functions and $e_t(\Sigma)$ is a residual fitting error. Thus, equation 1 can be expanded into full matrix notation as:

$$\begin{pmatrix} y_{t,1} \\ y_{t,2} \\ \vdots \\ y_{t,D} \end{pmatrix} = \begin{pmatrix} c_1^0 & c_1^1 & \cdots & c_1^N \\ c_2^0 & c_2^1 & \cdots & c_2^N \\ \vdots & \vdots & \vdots & \vdots \\ c_D^0 & c_D^1 & c_D^2 & c_D^N \end{pmatrix} \begin{pmatrix} f_0(t) \\ f_1(t) \\ \vdots \\ f_N(t) \end{pmatrix} + e_t(\Sigma) \quad \text{EQ. 2}$$

Where $Y_{t,d}$ represents the dth dimension of the tth feature vector, $C_d^n$ represents a weighting parameter for the n-th polynomial associated with the dth dimension and $f_n(t)$ represents the nth polynomial evaluated at time t. In one embodiment of equation 2, each polynomial function $f_n(t)$ is a Legendre polynomial of order n. In another embodiment, $f_1(t)$ is a first order polynomial, $f_2(t)$ is a second order polynomial and so on. To simplify computations, the polynomials are often drawn from a collection of orthogonal functions as mentioned in the previous two embodiments. Those skilled in the art, however, can appreciate that other orthogonal and/or non-orthogonal polynomials can also be used for segment modeling purposes. In most embodiments, the distribution of the residual error is often assumed to be an independent and identically distributed random process with one or a mixture of normal distributions of zero means and covariance matrices of $\Sigma$'s.

Equation 2 can be expanded to describe all of the feature vectors in a segment containing T feature vectors. Thus, equation 2 becomes:

$$\begin{pmatrix} y_{0,1} & y_{1,1} & \cdots & y_{T-1,1} \\ y_{0,2} & y_{1,2} & \cdots & y_{T-1,2} \\ \vdots & \vdots & \vdots & \vdots \\ y_{0,D} & y_{1,D} & \cdots & y_{T-1,D} \end{pmatrix} = \quad \text{EQ. 3}$$

-continued
$$\begin{pmatrix} c_1^0 & c_1^1 & \cdots & c_1^N \\ c_2^0 & c_2^1 & \cdots & c_2^N \\ \vdots & \vdots & \vdots & \vdots \\ c_D^0 & c_D^1 & \cdots & c_D^N \end{pmatrix} \begin{pmatrix} f_0(0) \ldots f_0(T-1) \\ f_1(0) \ldots f_1(T-1) \\ \vdots \\ f_N(0) \ldots f_N(T-1) \end{pmatrix} + \begin{pmatrix} e_{0,1} & \cdots & e_{T-1,1} \\ e_{0,2} & \cdots & e_{T-1,2} \\ \vdots & \vdots & \vdots \\ e_{0,D}^0 & \cdots & e_{T-1,D} \end{pmatrix}$$

Where $Y_{T-1,1}$ represents the first dimension of the feature vector at time T−1 and $f_0(T-1)$ represents the zero order polynomial evaluated at time T−1.

Equation 3 can be represented generally by:

$$Y_k = C_k F + E_k(\Sigma) \quad \text{EQ. 4}$$

Where $Y_k$ represents the feature vector matrix for a segment k, $C_k$ represents the trajectory parameter matrix for segment k, F represents the trajectory generation matrix, and $E_k(\Sigma)$ represents an error matrix that is based on a covariance matrix $\Sigma$.

Each segment state m in the model is associated with a word or sub-word unit and is defined by its parameter matrix $C_m$ and its covariance matrix $\Sigma_m$, which are referred to more generally as probabilistic parameters. During training of the segment model, the parameter matrix and the covariance matrix are chosen so that the model best matches the feature vectors provided for the respective sub-word or word unit in the training data. A particular method for training a segment model under the present invention is discussed further below.

Under the prior art, training the segment model involved a curve fitting step where the training feature vectors were used to generate a curve fitting parameter matrix $C_k$ and a curve fitting covariance matrix $\Sigma_k$ for each segment k in the training speech signal. Under one system of the prior art, this curve fitting involves calculating the parameter matrix as:

$$C_k = Y_k F^t [FF^t]^{-1} \quad \text{EQ. 5}$$

Where $C_k$ is the curve fitting parameter matrix for segment k, $Y_k$ is the observed sequence of feature vectors for the segment, F is the generation matrix, and the superscript t indicates a transpose. The curve fitting covariance matrix $\Sigma_k$ is calculated under the prior art as:

$$\Sigma_k = \frac{(Y_k - C_k F)(Y_k - C_k F)^t}{T_k} \quad \text{EQ. 6}$$

where $\Sigma_k$ is the curve fitting covariance matrix, $Y_k$ is the observed sequence of feature vectors for the current segment, $C_k$ is the curve fitting parameter matrix, F is the generation matrix, and $T_k$ is the number of feature vectors (duration) being analyzed for the current segment k.

Once the curve fitting matrices have been formed for each of the segments in the training text, the model is constructed. This is typically done using an expectation-maximization algorithm (EM). Under this algorithm, the model is iteratively changed until it becomes stable. Specifically, at iteration i, the model parameter matrix $C_m^i$ and model covariance matrix $\Sigma_m^i$ for the mth segment model are determined as:

$$C_m^i = \left[\sum_{k=1}^{K} \gamma_{m|k}^i C_k F T_k F_{T_k}'\right]\left[\sum_{k=1}^{K} \gamma_{m|k}^i F_{T_k}' F_{T_k}\right]^{-1} \quad \text{EQ. 7}$$

-continued $$\Sigma_m^i = \frac{\sum_{k=1}^{K} \gamma_{m|k}^i (C_k F_{T_k} - C_m^i F_{T_k})(C_k F_{T_k} - C_m^i F_{T_k})^t}{\sum_{k=1}^{K} \gamma_{m|k}^i T_k} \quad \text{EQ. 8}$$

Where k is the current input segment, K is the total number of input segments in the training data, m is the current segment model, $Y_k$ is the sequence of feature vectors for the current segment k, $F_{T_k}$ is the generation matrix evaluated at the time periods associated with the current segment, the superscript t indicates a transpose function, $C_k$ is the curve fitting parameter matrix for segment k, $T_k$ is the number of feature vectors for segment k, and $\gamma_{m|k}^i$ is the probability of the mth segment model given the current segment k. This probability is calculated as:

$$\gamma_{m|k}^i = \frac{p(C_k, \Sigma_k | C_m^{i-1}, \Sigma_m^{i-1}) w_m^{i-1}}{\sum_{j=1}^{M} [p(C_k, \Sigma_k | C_j^{i-1}, \Sigma_j^{i-1}) w_j^{i-1}]} \quad \text{EQ. 9}$$

Where $p(C_k, \Sigma_k | C_m^{i-1}, \Sigma_m^{i-1})$ is the probability of the curve fitting parameter matrix and curve fitting covariance matrix for the current segment given the model parameter matrix and the model covariance matrix calculated at a previous iteration, i−1, and M is the total number of segment models. In Equation 9, $w_m^{i-1}$ is the mixture weight for segment model, m, at the previous iteration. The new mixture weight for the current iteration can be obtained according to:

$$w_m^i = \frac{1}{K} \sum_{k=1}^{K} \left[ \frac{w_m^{i-1} \cdot p(C_k, \Sigma_k | C_m^{i-1}, \Sigma_m^{i-1})}{\sum_{j=1}^{M} [p(C_k, \Sigma_k | C_j^{i-1}, \Sigma_j^{i-1}) w_j^{i-1}]} \right] \quad \text{EQ. 10}$$

The denominators shown in equations 9 and 10 provide the total probability of the curve fitting parameter matrix and the curve fitting covariance matrix for the current segment given all of the available segment models of the previous iteration. We could use the following equation to denote this total likelihood.

$$P(C_k, \Sigma_k) = \sum_{j=1}^{M} [p(C_k, \Sigma_k | C_j^{i-1}, \Sigma_j^{i-1}) w_j^{i-1}] \quad \text{EQ. 11}$$

In equations 9 and 10, the probability of the curve fitting parameter matrix and the curve fitting covariance matrix for the current segment given a model parameter matrix and a model covariance matrix, $p(C_k, \Sigma_k | C_m, \Sigma_m)$, is calculated as:

$$p(C_k, \Sigma_k | C_m, \Sigma_m) = \quad \text{EQ. 12}$$
$$\frac{\exp\left(-\frac{1}{2} tr[(C_k F_{T_k} - C_m F_{T_k}) \Sigma_m^{-1} (C_k F_{T_k} - C_m F_{T_k})^t] - \frac{T_k}{2} tr(\Sigma_m^{-1} \Sigma_k)\right)}{(2\pi)^{\frac{DT_k}{2}} |\Sigma_m|^{\frac{T_k}{2}}}$$

Where D is the dimension of the feature vectors, $C_m$ is the model parameter matrix and $\Sigma_m^{-1}$ is the inverse of the model covariance matrix. Note that the iteration marker i has been removed for simplicity since we can use $C_m^i$ and $\Sigma_m^i$ to replace $C_m$ and $\Sigma_m$ for each iteration. In equation 12, the superscript t indicates a transpose function.

Note that in equation 12, the probability is based on the difference being taken between the curve fitting parameter matrix and the model parameter matrix plus the curve fitting error. This means that a curve fitting step must be performed for each segment in the training data before the model can be generated. Because of this, the model training process of the prior art is inefficient.

Once the model of the prior art is constructed, it can be used to determine the likelihood of an observed segment for a particular sub-word unit. Under the prior art, this likelihood was determined by first performing curve fitting on the observed feature vectors. This resulted in a curve fitting parameter matrix, $C_k$, and a curve fitting covariance matrix $\Sigma_k$ for each possible segment in the input speech pattern. Under the prior art, these curve fitting matrices were calculated using equations 5 and 6 above. Once the curve fitting matrices had been calculated, the prior art calculated the likelihood of the curve fitting matrices given the model parameter matrix and the model covariance matrix. This likelihood was calculated using equations 11 and 12 above.

Figure 4:
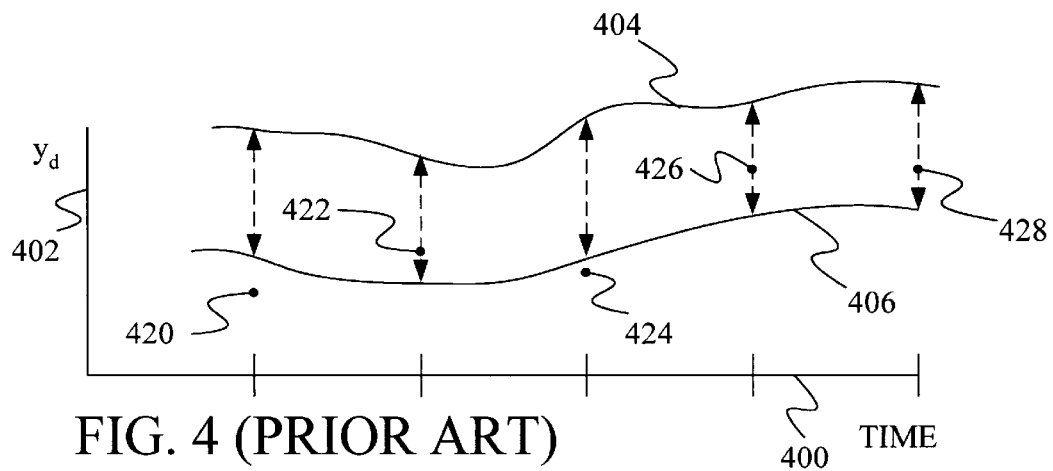
FIG. 4 is a graph showing a segment model curve and a fitted curve of the prior art.

FIG. 4 depicts a graphical representation of the way in which the prior art determined the probability of the feature vectors of a current segment given a model. In FIG. 4, time is shown along the horizontal axis 400 and the magnitude of a single dimension of the feature vectors is shown along vertical axis 402. FIG. 4 shows two curves, curve 404 is the model curve generated by the model parameter matrix and model covariance matrix. Curve 406 is the curve generated by a curve fitting parameter matrix and curve fitting covariance matrix for the current segment. Under the prior art, the probability of the current segment given the model was essentially determined by measuring the distances between curve 404 and 406 at the feature vector time marks plus the curve fitting error. Thus, the differences were calculated at time marks 408, 410, 412, 414 and 416. Note that the distances between curve 406 and the individual feature vector values 420, 422, 424, 426, and 428 are measured to form the curve fitting error.

Thus, under the decoding technique of the prior art, a curve fitting step had to be performed for each possible segment in the input speech signal. Since several different segmentations are possible in a speech signal, a large number of curve fitting operations had to be performed under the prior art. Because these curve fitting operations are time consuming, they cause the prior art detection to be inefficient.

The present invention overcomes the inefficiencies of training a trajectory segment model and using a trajectory segment model to decode speech signals into sequences of words. The present invention improves the efficiency by removing the step of generating curve fitting matrices for the segments during training and decoding.

Specifically, under the present invention, the model parameter matrix, $C_m^i$ and the model covariance matrix $\Sigma_m^i$ are trained using the following equations:

$$C_m^i = \left[\sum_{k=1}^{K} \gamma_{m|k}^i Y_k F_{T_k^i}\right]\left[\sum_{k=1}^{K} \gamma_{m|k}^i Y_k F_{T_k^i}\right]^{-1} \quad \text{EQ. 13}$$

$$\Sigma_m^i = \frac{\sum_{k=1}^{K} \gamma_{m|k}^i (Y_k - C_m^i F_{T_k})(Y_k - C_m^i F_{T_k})^t}{\sum_{k=1}^{K} \gamma_{m|k}^i T_k} \quad \text{EQ. 14}$$

where i is the training iteration, m is the current model, k is the current segment, K is the total number of segments in the training utterance, $F_{T_k}$ is the trajectory generation matrix evaluated at the current segment, $T_k$ is the total number of feature vectors in the current segment, $Y_k$ is the sequence of observed feature vectors for the current segment, and $\gamma_{m|k}^i$ is the probability of the mth model given the current segment k. This probability is defined under the present invention as:

$$\gamma_{m|k}^j = \frac{p(Y_k | C_m^{i-1}, \Sigma_m^{i-1}) \cdot w_m^{j-1}}{\sum_{j=1}^{M} [p(Y_k | C_j^{i-1}, \Sigma_j^{i-1}) w_j^{j-1}]} \quad \text{EQ. 15}$$

where $C_m^{i-1}$ and $\Sigma_m^{i-1}$ are the model parameter matrix and model covariance matrix of the previous training iteration, $Y_k$ is the sequence of observed feature vectors for the current segment k, and $w_m^{i-1}$ is the mixture weight for segment model, m, at the previous iteration. The new mixture weight for current iteration can be obtained according to:

$$w_m^j = \frac{1}{K} \sum_{k=1}^{K} \left[\frac{p(Y_k | C_m^{i-1}, \Sigma_m^{i-1}) \cdot w_m^{j-1}}{\sum_{j=1}^{M} [p(Y_k | C_j^{i-1}, \Sigma_j^{i-1}) w_j^{j-1}]}\right] \quad \text{EQ. 16}$$

The denominators shown in equations 15 and 16 provide the total probability of the feature vectors for the current segment given all of the available segment models of the previous iteration. We could use the following equation to denote this total likelihood.

$$P(Y_k) = \sum_{j=1}^{M} [p(Y_k | C_j^{i-1}, \Sigma_j^{i-1}) w_j^{j-1}] \quad \text{EQ. 17}$$

In equations 15 and 16, the probability of the observed sequence of feature vector $Y_k$, given the model parameter matrix and the model covariance matrix, $p(Y_k | C_m, \Sigma_m)$, is calculated under one embodiment of the present invention using a Gaussian distribution of:

$$p(Y_k | C_m, \Sigma_m) = \frac{\exp\left(-\frac{1}{2} tr[(Y_k - C_m F_{T_k}) \Sigma_m^{-1} (Y_k - C_m F_{T_k})^t]\right)}{(2\pi)^{\frac{DT_k}{2}} |\Sigma_m|^{\frac{T_k}{2}}} \quad \text{EQ. 18}$$

where $Y_k$ is a sequence of $T_k$ feature vectors of dimension D for a segment k, $C_m$ is a model parameter matrix for a segment model state m, $F_{T_k}$ is a model generation matrix evaluated at the time periods associated with the feature vectors, $\Sigma_m^{-1}$ is the inverse of the covariance matrix for segment model state m, and the superscript t represents the transpose function.

Figure 5:
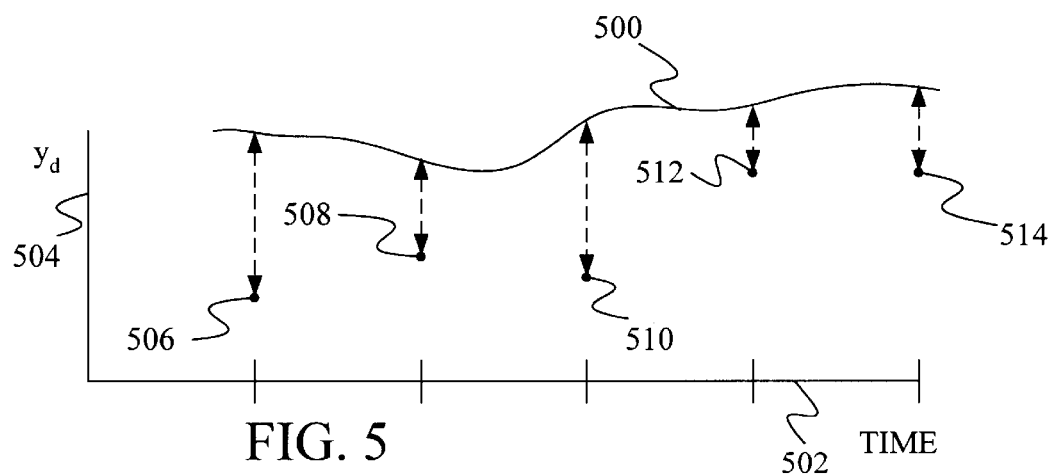
FIG. 5 is a graph of a segment model curve showing a graphical representation of a probability determination under the present invention.

Note that equations 13, 14, 16 and 18 do not require a curve fitting parameter matrix or a curve fitting covariance matrix. Instead, the model parameter matrix and model covariance matrix are constructed simply by comparing the observation vectors directly to the previous model. The difference between this approach and the approach of the prior art can be seen by comparing FIG. 4 to FIG. 5 of the present invention. In FIG. 4, the model was trained based on a comparison between a curve associated with the curve fitting matrices and a curve associated with the model matrices plus the curve fitting error. In FIG. 5, however, the model is trained by comparing a curve based on the model matrices of the previous iteration with the actual feature vectors. Specifically, in FIG. 5, a curve 500 based on the model matrices is shown for a single dimension of the feature vectors. In FIG. 5, time is shown along horizontal axis 502 and the magnitude of the feature vectors' dimensional component is shown along vertical axis 504. The values of the dimensional component for the sequence of feature vectors are shown as dots 506, 508, 510, 512 and 514.

Because the present invention does not need to perform curve fitting while generating the model, it requires less time to generate the model.

The present invention also does not require curve fitting during segment decoding. Under the present invention, the probability of a sequence of feature vectors is calculated directly from the model parameter matrix and the model covariance matrix using equations 17 and 18 above. Thus, for each segment, the probability of a sequence of observed feature vectors is determined based on the proximity of those feature vectors to a curve formed from the model parameter matrix and the model covariance matrix. Since the present invention does not require the generation of curve fitting matrices as in the prior art, the decoding process under the present invention is much more efficient.

Although the present invention has been described with reference to particular embodiments, workers skilled in the art will recognize that changes may be made in form and detail without departing from the spirit and scope of the invention.

What is claimed is:

1. A speech recognition system for identifying words from a series of feature vectors representing speech, the system comprising:

a segment model capable of providing a trajectory expression for each of a set of segment states, wherein the trajectory expression is formed by at least one polynomial which comprises the product of a trajectory parameter matrix and a trajectory generation matrix; and a decoder capable of generating a path score that is indicative of the probability that a sequence of words is represented by the series of feature vectors, the path score being based on a feature probability that is determined in part based on differences between a sequence of feature vectors and a segment state's trajectory expression.

2. The speech recognition system of claim 1 wherein the segment model comprises a set of probabilistic parameters and wherein the feature probability represents the probability of the sequence of feature vectors given the probabilistic parameters.

3. The speech recognition system of claim 2 wherein the probabilistic parameters comprise the trajectory parameter matrix and a covariance matrix.

4. The speech recognition system of claim 3 wherein the feature probability is calculated as $$p(Y_k|C_m, \Sigma_m) = \frac{\exp\left(-\frac{1}{2}tr[(Y_k - C_m F_{T_k})\Sigma_m^{-1}(Y_k - C_m F_{T_k})^t]\right)}{(2\pi)^{\frac{DT_k}{2}}|\Sigma_m|^{\frac{T_k}{2}}}$$

where $p(Y_k|C_m,\Sigma_m)$ is the feature probability, $Y_k$ is a sequence of $T_k$ feature vectors of dimension D for segment k, $C_m$ is the trajectory parameter matrix for segment state m, $\Sigma_m$ is the covariance matrix for segment state m, $\Sigma_m^{-1}$ is the inverse of the covariance matrix for segment state m, $F_{T_k}$ is the trajectory generation matrix for $T_k$ feature vectors, and the superscript t represents the transpose function.

5. The speech recognition system of claim 2 further comprising a trainer for training the probabilistic parameters for each segment state.

6. The speech recognition system of claim 5 wherein the trainer adaptively trains the probabilistic parameters based on a probability that is determined in part by taking the difference between a sequence of training feature vectors and the trajectory expression provided by the segment model.

7. The speech recognition system of claim 6 wherein the probabilistic parameters comprise a trajectory parameter matrix that is adaptively trained according to:

$$C_m^i = \left[\sum_{k=1}^{K} \gamma_{m|k}^i Y_k F_{T_k}^t\right]\left[\sum_{k=1}^{K} \gamma_{m|k}^i Y_k F_{T_k}^t\right]^{-1}$$

where i is a training iteration, m is current segment state, $C_m^i$ is the trajectory parameter matrix for the segment state m calculated at training iteration i, k is a current segment of a training utterance, K is a total number of segments in the training utterance, $F_{T_k}$ is a trajectory generation matrix for $T_k$ feature vectors, $T_k$ is the total number of training feature vectors in the current segment, $Y_k$ is the current sequence of training feature vectors in the current segment, superscript t represents a transpose function, and $\gamma_{m|k}^i$ is the probability of the mth model given the current segment k.

8. The speech recognition system of claim 7 wherein $\gamma_{m|k}^i$ is calculated based in part on a feature probability that provides the likelihood of the current sequence of training feature vectors given a segment model of a previous iteration, the feature probability calculated as:

$$p(Y_k|C_m^{i-1}, \Sigma_m^{i-1}) = \frac{\exp\left(-\frac{1}{2}tr[(Y_k - C_m^{i-1} F_{T_k})(\Sigma_m^{i-1})^{-1}(Y_k - C_m^{i-1} F_{T_k})^t]\right)}{(2\pi)^{\frac{DT_k}{2}}|\Sigma_m^{i-1}|^{\frac{T_k}{2}}}$$

where $p(Y_k|C_m^{i-1},\Sigma_m^{i-1})$ is the feature probability, $Y_k$ is the sequence of $T_k$ training feature vectors of dimension D for current segment k, $C_m^{i-1}$ is the trajectory parameter matrix for segment state m for the previous training iteration i−1, $\Sigma_m^{i-1}$ is the covariance matrix for segment state m for the previous training iteration i−1, $(\Sigma_m^{i-1})$ is the inverse of the covariance matrix for segment state m for the previous training iteration i−1, $F_{T_k}$ is a trajectory generation matrix for $T_k$ feature vectors, and the superscript t represents the transpose function.

9. A method of speech recognition comprising:

accessing a segment model's description of a curve for a segment of speech by accessing a parameter matrix and a generation matrix;

determining differences between the curve and input feature vectors associated with the segment of speech;

using the differences to determine a segment probability that describes the likelihood of the input feature vectors given the segment model; and identifying a most likely sequence of hypothesized words based in part on the segment probability.

10. The method of claim 9 wherein determining differences between the curve and the input feature vectors comprises multiplying the parameter matrix by the generation matrix to produce a product and subtracting the product from a matrix containing the input feature vectors.

11. The method of claim 9 wherein using the differences to determine a segment probability comprises calculating the probability as:

$$p(Y_k|C_m, \Sigma_m) = \frac{\exp\left(-\frac{1}{2}tr[(Y_k - C_m F_{T_k})\Sigma_m^{-1}(Y_k - C_m F_{T_k})^t]\right)}{(2\pi)^{\frac{DT_k}{2}}|\Sigma_m|^{\frac{T_k}{2}}}$$

where $p(Y_k|C_m,\Sigma_m)$ is the segment probability, $Y_k$ is a sequence of $T_k$ feature vectors of dimension D for a segment k, $C_m$ is the parameter matrix for segment state m, $\Sigma_m$ is a covariance matrix for segment state m, $\Sigma^{m-1}$ is the inverse of the covariance matrix for segment state m, $F_{T_k}$ is the generation matrix for $T_k$ feature vectors, and the superscript t represents the transpose function.

12. The method of claim 9 further comprising training the segment model through an iterative process that trains a present iteration's segment model in part by determining differences between training feature vectors and a curve described by a previous iteration's segment model.

13. The method of claim 12 wherein determining differences between the training feature vectors and a curve described by a previous iteration's segment model comprises multiplying a parameter matrix of a previous iteration by a generation matrix to produce a product and subtracting the product from a matrix containing the training feature vectors.

14. The method of claim 13 wherein training the present iteration's segment model further comprises determining the present iteration's parameter matrix through the calculation of:

$$C_m^i = \left[\sum_{k=1}^{K} \gamma_{m|k}^i Y_k F_{T_k}^t\right]\left[\sum_{k=1}^{K} \gamma_{m|k}^i Y_k F_{T_k}^t\right]^{-1}$$

where i is the present training iteration, m is current segment state, $C_m^i$ is the parameter matrix for the segment state m calculated at the present training iteration i, k is a current segment of a training utterance, K is a total number of segments in the training utterance, $F_{T_k}$ is the generation matrix for $T_k$ feature vectors, $T_k$ is the total number of training feature vectors in the current segment, $Y_k$ is the current sequence of training feature vectors in the current segment, superscript t represents a transpose function, and $\gamma_{m|k}^i$ is the probability of the mth model given the current segment k.

15. The method of claim 14 wherein $\gamma_{m|k}^i$ is calculated based in part on a feature probability that provides the likelihood of the current sequence of training feature vectors given a parameter matrix of a previous iteration and a covariance matrix of a previous iteration, the feature probability calculated as:

$$p(Y_k|C_m^{i-1}, \Sigma_m^{i-1}) = \frac{\exp\left(-\frac{1}{2}tr\left[(Y_k - C_m^{i-1}F_{T_k})(\Sigma_m^{i-1})^{-1}(Y_k - C_m^{i-1}F_{T_k})^t\right]\right)}{(2\pi)^{-\frac{DT_k}{2}}|\Sigma_m^{i-1}|^{\frac{T_k}{2}}}$$

where $p(Y_k|C_m^{i-1},\Sigma_m^{i-1})$ is the feature probability, $Y_k$ is the sequence of $T_k$ training feature vectors of dimension D for current segment k, $C_m^{i-1}$ is the parameter matrix for segment state m for the previous training iteration i-1, $\Sigma_m^{i-1}$ is the covariance matrix for segment state m for the previous training iteration i-1, $(\Sigma_m^{i-1})^{-1}$ is the inverse of the covariance matrix for segment state m for the previous training iteration i-1, $F_{T_k}$ is the generation matrix for $T_k$ feature vectors, and the superscript t represents the transpose function.

16. A method of training a speech recognition system using training feature vectors generated from a training speech signal, the method comprising:

segmenting the training feature vectors into segments aligned with units of training text;

determining differences between training feature vectors of a segment and a curve defined by a segment model associated with the segment's unit of text, wherein determining differences comprises multiplying a model parameter matrix by a model generation matrix to produce a product and subtracting the product from a matrix of training feature vectors; and using the differences to determine a revised segment model for the unit of text.

17. The method of claim 16 wherein using the differences to determine a revised segment model comprises performing a calculation of:

$$C_m^i = \left[\sum_{k=1}^{K} \gamma_{m|k}^j Y_k F_{T_k^t}^t\right]\left[\sum_{k=1}^{K} \gamma_{m|k}^j Y_k F_{T_k^t}^t\right]^{-1}$$

where i is the present training iteration, m is current segment state, $C_m^i$ is the parameter matrix for the segment state m calculated at the present training iteration i, k is a current segment of a training utterance, K is a total number of segments in the training utterance, $F_{T_k}$ is the model generation matrix for $T_k$ feature vectors, $T_k$ is the total number of training feature vectors in the current segment, $Y_k$ is the current sequence of training feature vectors in the current segment, superscript t represents a transpose function, and $\gamma_{m|k}^i$ is the probability of the mth model given the current segment k.

18. The speech recognition system of claim 17 wherein $\gamma_{m|k}^i$ is calculated based in part on a feature probability that provides the likelihood of the current sequence of training feature vectors given a parameter matrix of a previous iteration and a covariance matrix of a previous iteration, the feature probability calculated as:

$$p(Y_k|C_m^{i-1}, \Sigma_m^{i-1}) = \frac{\exp\left(-\frac{1}{2}tr\left[(Y_k - C_m^{i-1}F_{T_k})(\Sigma_m^{i-1})^{-1}(Y_k - C_m^{i-1}F_{T_k})^t\right]\right)}{(2\pi)^{-\frac{DT_k}{2}}|\Sigma_m^{i-1}|^{\frac{T_k}{2}}}$$

where $p(Y_k|C_m^{i-1}\Sigma_m^{i-1})$ is the feature probability, $Y_k$ is the sequence of $T_k$ training feature vectors of dimension D for current segment k, $C_m^{i-1}$ is the parameter matrix for segment state m for a previous training iteration i-1, $\Sigma_m^{i-1}$ is the covariance matrix for segment state m for the previous training iteration i-1$\Sigma_m^{i-1}$, is the inverse of the covariance matrix for segment state m for the previous training iteration i-1, $F_{T_k}$ is the model generation matrix for $T_k$ feature vectors, and the superscript t represents the transpose function.

19. A computer-readable medium having computer-executable components for performing steps comprising:

evaluating trajectory expressions at selected frames of a speech signal, the trajectory expressions representing a segment model for a speech recognition system, wherein evaluating trajectory expressions comprises multiplying a model parameter matrix by a model generation matrix to produce a product and evaluating the product at selected frames;

determining differences between the evaluated trajectory expressions and feature vectors generated from a speech signal;

using the differences to determine a segment probability that describes the likelihood of the feature vectors given the segment model; and identifying the likelihood of a sequence of words being present in the speech signal based in part on the segment probability.

20. The computer-readable medium of claim 19 wherein determining differences comprises subtracting the product from the feature vectors.

21. The computer-readable medium of claim 20 wherein determining a segment probability comprises calculating the probability as:

$$p(Y_k|C_m, \Sigma_m) = \frac{\exp\left(-\frac{1}{2}tr[(Y_k - C_mF_{T_k})\Sigma_m^{-1}(Y_k - C_mF_{T_k})^t]\right)}{(2\pi)^{-\frac{DT_k}{2}}|\Sigma_m|^{\frac{T_k}{2}}}$$

where $p(Y_k|C_m,\Sigma_m)$ is the segment probability, $Y_k$ is a sequence of $T_k$ feature vectors of dimension D for a segment k, $C_m$ is the model parameter matrix for segment state m, $\Sigma_m$ is a model covariance matrix for segment state m, $\Sigma_m^{-1}$ is the inverse of the model covariance matrix for segment state m, $F_{T_k}$ is the model generation matrix for $T_k$ feature vectors, and the superscript t represents the transpose function.

* * * * *